(12) United States Patent
Schwinghammer et al.

(10) Patent No.: US 8,087,517 B2
(45) Date of Patent: Jan. 3, 2012

(54) FILTER ELEMENT

(75) Inventors: Alfons Schwinghammer, Dingolfing (DE); Frank Pflüger, Sachsenheim (DE)

(73) Assignee: Mann + Hummel GmbH, Ludwigsburg (DE)

( * ) Notice: Subject to any disclaimer, the term of this patent is extended or adjusted under 35 U.S.C. 154(b) by 732 days.

(21) Appl. No.: 12/158,696

(22) PCT Filed: Dec. 12, 2006

(86) PCT No.: PCT/EP2006/069565
§ 371 (c)(1),
(2), (4) Date: Sep. 7, 2008

(87) PCT Pub. No.: WO2007/074050
PCT Pub. Date: Jul. 5, 2007

(65) Prior Publication Data
US 2009/0045132 A1 Feb. 19, 2009

(30) Foreign Application Priority Data

Dec. 23, 2005 (DE) .................. 20 2005 020 260 U

(51) Int. Cl.
*B01D 29/13* (2006.01)

(52) U.S. Cl. .................. 210/457; 210/493.2; 210/497.01

(58) Field of Classification Search .................. 210/457, 210/483, 493.2, 497.01
See application file for complete search history.

(56) References Cited

U.S. PATENT DOCUMENTS

| | | | | |
|---|---|---|---|---|
| 3,867,294 A * | 2/1975 | Pall et al. | .................. | 210/497.01 |
| 4,521,309 A * | 6/1985 | Pall | .................. | 210/493.2 |
| 4,664,801 A * | 5/1987 | Thomas | .................. | 210/493.2 |
| 5,225,077 A * | 7/1993 | Feint | .................. | 210/493.2 |
| 6,143,046 A | 11/2000 | Freudenberg | | |
| 6,186,341 B1 * | 2/2001 | Konstantin et al. | .................. | 210/493.2 |
| 6,723,270 B1 * | 4/2004 | Sugiyama et al. | .................. | 210/493.2 |
| 6,739,459 B1 * | 5/2004 | Hartmann | .................. | 210/457 |
| 7,828,155 B2 * | 11/2010 | Proulx et al. | .................. | 210/493.2 |
| 2001/0010297 A1 * | 8/2001 | Pulek et al. | .................. | 210/493.2 |

FOREIGN PATENT DOCUMENTS

DE 4324388 C1 9/1994
GB 1327382 A 8/1973

OTHER PUBLICATIONS

Translation of DE 43 24 388, Sep. 1994.*

* cited by examiner

Primary Examiner — Christopher Upton

(57) ABSTRACT

A filter element has at least one plastic part, a filter medium, and a potting compound that forms a connection between the at least one plastic part and the filter medium. A connecting part is connected fixedly to the at least one plastic part. The potting compound penetrates at least partially into the connecting part.

6 Claims, 4 Drawing Sheets

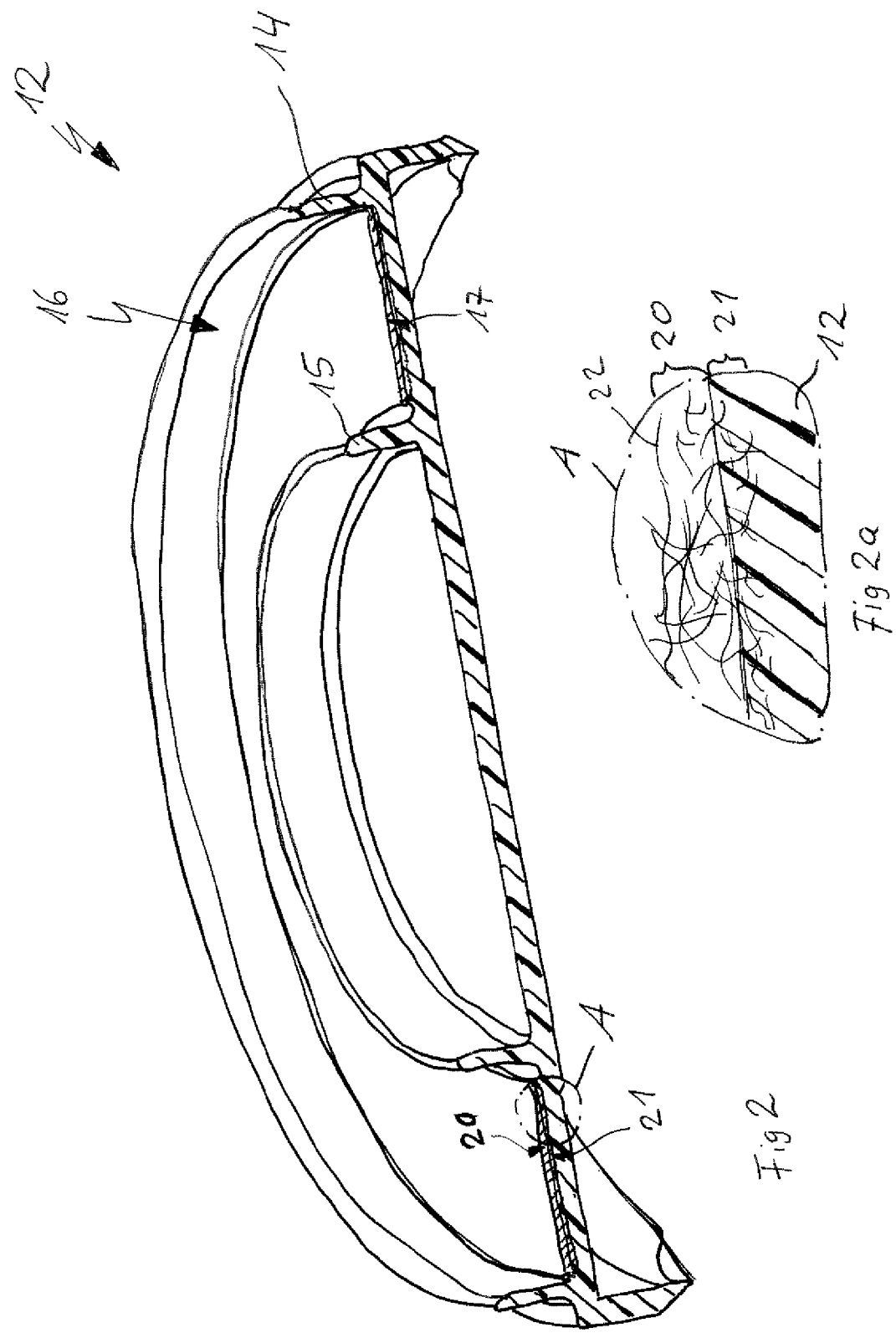

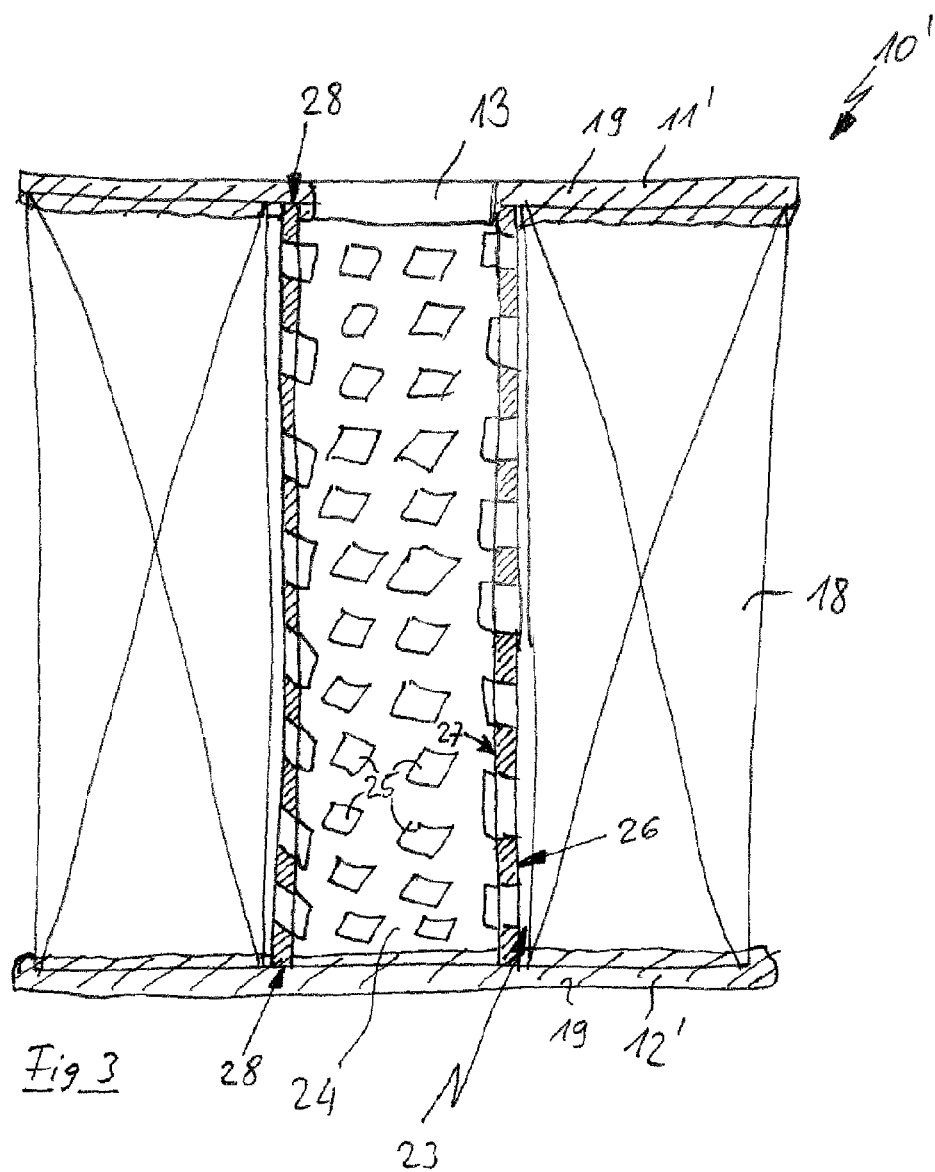
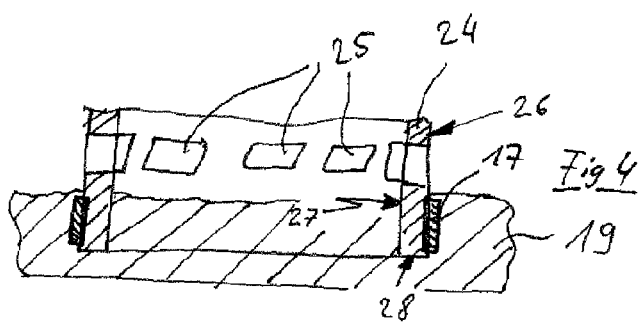

FILTER ELEMENT

TECHNICAL FIELD

The invention concerns a filter element according to the preamble of claim 1.

PRIOR ART

Filter elements are known that comprise plastic terminal disks and filter media. Between the plastic terminal disks and the filter medium a seal-tight connection is generated by means of a PUR potting compound (polyurethane potting compound). In other configurations the filter element comprises additionally a support tube of plastic material that is also seal-tightly connected by means of the potting compound to the filter element. The PUR potting compound however can become detached from the plastic parts by factors affecting it, for example, aging of the PUR potting compound, temperature fluctuations or vibrations, and this leads to leakage.

Object of the invention is therefore to provide a filter element that has a permanent seal-tight connection between the plastic parts and the filter medium. This object is solved by the features according to claim 1.

DISCLOSURE OF THE INVENTION

The filter element according to the invention is provided for cleaning a fluid. The fluid can be gaseous or liquid. Preferably, the filter element is provided for filtering intake air of an internal combustion engine. In this connection, the filter element can be configured as a flat element or as an annularly closed filter element. The filter element comprises at least one plastic part and a filter medium that is suitable for separating contaminants from the fluid stream. In this connection, any of the filter media known in the art can be employed. The plastic parts can be comprised of a thermoset material, or an elastomer or a thermoplastic material. A connecting part is arranged on the plastic part and is connected non-detachably to the plastic part. The connecting part can be glued to the plastic part, welded to it or embedded therein, wherein at least portions of the connecting part project from the plastic part. The connecting part, comprised of a plastic foam, cellulose paper or a fiber nonwoven, has a porous structure. This porous structure can have holes, channels or interstices into which a potting compound can penetrate. In this connection, the potting compound can be comprised preferably of a polyurethane or any cast resin. The potting compound contacts, on the one hand, the plastic part in the area of the connecting part and, on the other hand, the filter medium. The potting compound thus forms a seal-tight connection between the plastic part and the filter medium, wherein the potting compound can form parts, in particular terminal disks, of a round filter element. The penetration of the potting compound into the connecting part provides after solidification of the potting compound a permanently fixed interconnection that forms a seal-tight connection between the plastic part and the potting compound and thus with the filter medium.

According to a further embodiment of the invention the connecting part is a nonwoven part that comprises a fleece section that projects past the plastic part and a connecting section that is fixedly connected to the plastic part. The nonwoven part is preferably a plastic nonwoven that is comprised of numerous individual fibers and in this way forms the fleece section. The connecting section can be, for example, comprised of pressed fibers that are glued to the plastic part or welded thereto. Moreover, the connecting section of the connecting part can also project into the plastic part and in this way form the fixed connection. The fleece section is designed such that, on the one hand, it is provided with sufficient interstices between the fibers into which the potting compound can penetrate and, on the other hand, the fibers themselves have a satisfactory stability so that detachment of the potting compound from the plastic part is prevented.

In a further embodiment of the invention the plastic part is comprised of a thermoplastic material wherein the plastic part is produced by an injection molding process. The connecting part is placed as a pre-manufactured component into the injection mold of the plastic part and, subsequently, the plastic melt is injected into the injection mold. The plastic melt penetrates partially into the connecting part and thus forms a fixed connection. In other variants, the connecting part will melt in the contact area with the melt and thus forms a non-detachable connection upon solidification of the plastic melt. Connecting the plastic part and the connecting part by injection molding is a simple and inexpensive method.

In another advantageous embodiment, the plastic part is a plastic terminal disk of a round filter element, wherein the filter medium is annularly closed. In the context of this application, the term "annularly closed" is to be understood not only as a closed shape of a filter element in the form of a circular ring but also any hollow shape, in particular, an oval or polygonal shape. The plastic terminal disk is arranged on the end face of the filter medium. The connecting part is arranged in the area of the plastic terminal disk that is facing the filter medium. The connecting part in this embodiment is of an annular shape wherein the connecting part extends across the entire area of the plastic terminal disk that coincides with the filter medium. In this way, a reliable seal-tight connection between the filter medium and the plastic terminal disk is ensured.

In an alternative embodiments the plastic part is a support tube that is arranged in a round filter element. The support tube is provided for mechanically stabilizing the filter medium and is designed to be permeable for the fluid to be filtered. In an arrangement of the support tube in the annularly closed filter medium, the latter is supported by the outer circumference of the support tube. In an arrangement in which the support tube surrounds the filter medium, the filter medium is supported by the inner surface of the support body. The support tube has end faces that match the terminal disks. In this connection, the terminal disks can be comprised of any suitable material such as plastics, metal, rubber or the potting compound itself. In the area of the end faces, the connecting part is arranged on the support tube. In this connection, the connecting part can be arranged on the outer circumference, the inner surface, or the annular surface at the end face. By application of the potting compound onto the support tube a fixed seal-tight connection between the potting compound and the support tube is formed. Inasmuch as the terminal disk is formed by the potting compound, a seal-tight connection between the terminal disk, the support tube, and the filter medium exists which filter medium is also enclosed by the potting compound.

BRIEF DESCRIPTION OF THE DRAWINGS

Further details of the invention with be explained in the following with the aid of schematic embodiments. It is shown in:

FIG. 2 a terminal disk in section;
FIG. 3 an alternatively designed filter element in section;
FIG. 4 a detail of a support tube in section.

EMBODIMENT(S) OF THE INVENTION

Figure 1:
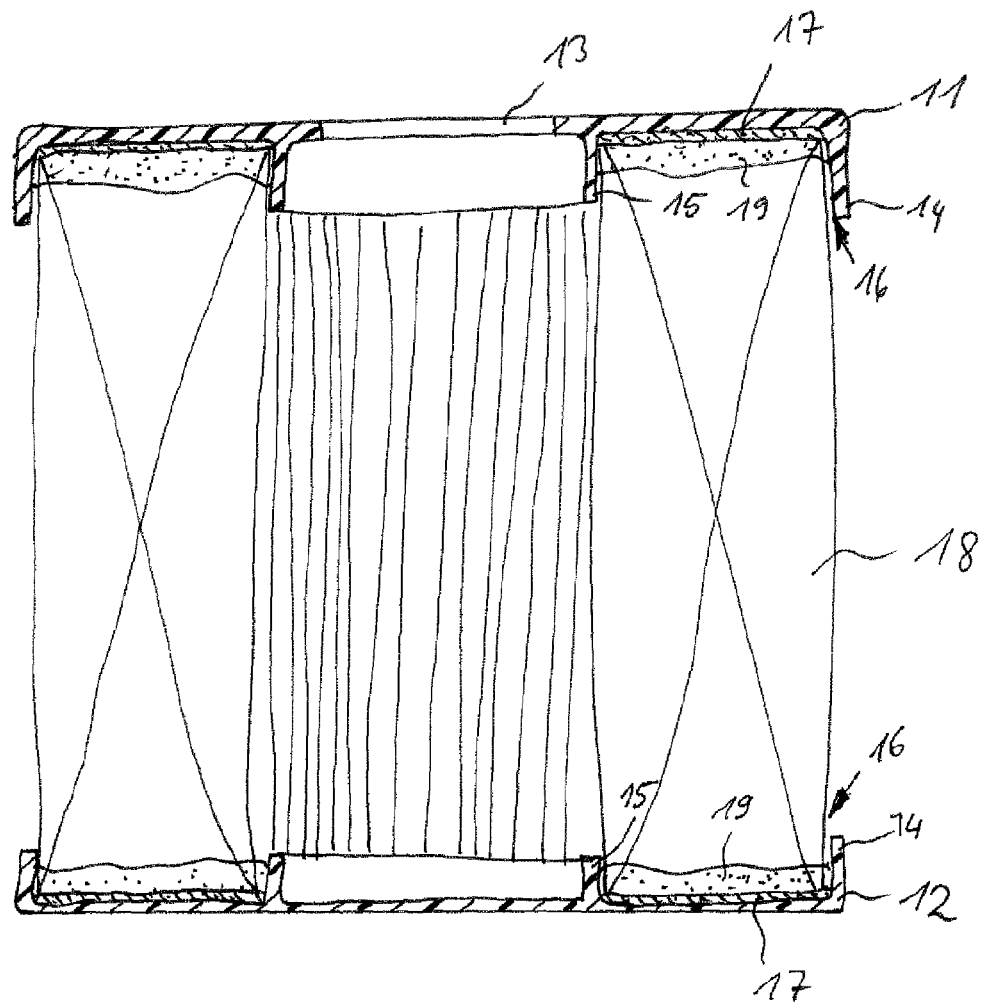
FIG. 1 a filter element in section.

In FIG. 1, a filter element 10 is shown in section. The filter element 10 has an upper terminal disk 11 and a lower terminal disk 12 wherein the terminal disks 11, 12 are comprised of polyamide. The upper terminal disk 11 has an opening 13 through which the fluid to be filtered or the fluid that has already been filtered can flow. The lower terminal disk 12 is of a closed configuration. Both terminal disks 11, 12 have an outer cast edge 14 and an inner cast edge 15. The cast edges 14, 15 form for each one of the terminal disks 11, 12 an annular cast receptacle 16. In each cast receptacle 16 a nonwoven ring 17 is arranged that is non-detachably connected to the terminal disk 11, 12, respectively. A folded annularly closed filter medium 18 extends between the terminal disks 11, 12. The filter medium 18 projects into the cast receptacle 16 of the terminal disks 11, 12. For fixation of the filter medium 18 in the cast receptacle 16 of the terminal disks 11, 12, a potting compound 19 is provided which, on the one hand, embeds the ends of the filter medium 18 and, on the other hand, penetrates the nonwoven ring 17. In this way, a non-detachable seal-tight connection between the terminal disk 11, 12 and the filter medium is provided which connection cannot be detached even by external influences such as vibrations or temperature fluctuations.

In FIG. 2, the lower terminal disk 12 according to FIG. 1 is illustrated in a perspective illustration in section wherein a detail A is shown enlarged in FIG. 2a. Parts that correspond to those of FIG. 1 are identified with same reference numerals. The nonwoven ring 17 has a fleece section 20 and connecting section 21. The fleece section 20 projects from the terminal disk 12 into the cast receptacle 16. In this connection, the fleece section 20 is formed by fibers 22 that rest loosely against one another. The connecting section 21 is formed by fibers 22 embedded in the plastic material of the terminal disk 12. In this way, the connection between the terminal disk 12 and the nonwoven ring 17 is non-detachable. The nonwoven ring 17 and the upper terminal disk 11 are connected in the same way.

In FIG. 3 an alternative filter element 10' is shown in section. Parts that correspond to those of FIG. 1 are identified with the same reference numerals. The filter element 10' has a zigzag-shaped folded and annularly dosed filter medium 18 which is arranged between two terminal disks 11' and 12'. In the cavity 23 formed by the filter medium 18 a support tube 24 is arranged. The support tube 24 is comprised of plastic material and has passages 25 through which the fluid can flow. Moreover, the support tube 24 has an outer circumference 26, an inner surface 27, and end faces 28. The support tube 24 is embedded in the area of the end faces 28 by the potting compound 19. In this embodiment, the terminal disks 11' and 12' are formed by the potting compound 19. The geometric outer dimensions of the terminal disks 11' and 12' are shaped by a mold (not illustrated) into which the liquid potting compound 19 is filled and removed in the form of the terminal disks after solidification. For forming a non-detachable connection between the support tube 24 and the potting compound 19, a non-woven ring 17 is provided in accordance with embodiments described in connection with FIGS. 4 through 6.

In FIG. 4 a section of the filter element 10' according to FIG. 3 is illustrated. The components corresponding to FIG. 3 are identified with the same reference numerals. The non-woven ring 17 in the area of the end faces 28 is arranged on the outer circumference 26. The non-woven ring 17, as disclosed in connection with FIG. 2a, is connected to the support tube 24. The potting compound 19 embeds the end face area of the support tube 24 wherein the non-woven ring 17 is also embedded. In this way, the outer circumference of the support tube 24 is non-detachably connected to the potting compound 19 wherein this connection is seal-tight.

Figure 5:
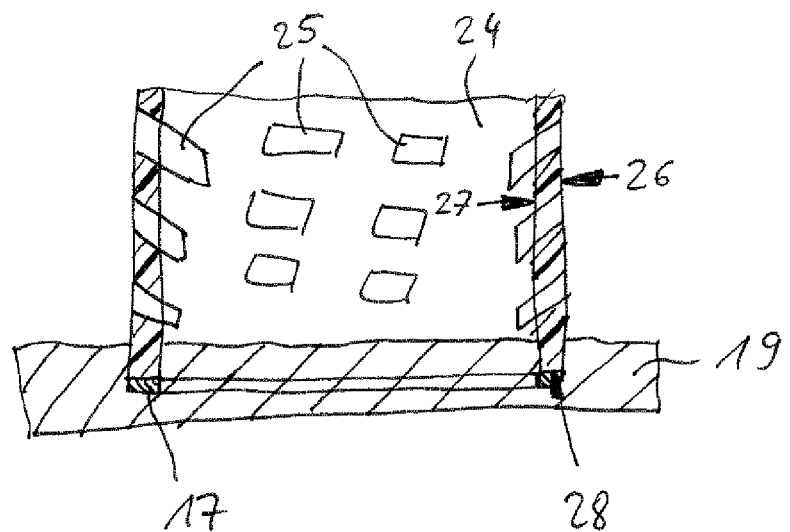
FIG. 5 an alternative embodiment of the support tube in section.

In FIG. 5 an alternative to the solution illustrated in FIG. 4 is shown. Same parts are identified with the same reference numerals. In this alternative, the non-woven ring 17 is placed onto the end face 28 of the support tube 24. In this connection, the connection of the nonwoven ring 17 with the support body 24 corresponds to the connection described in FIG. 2a.

Figure 6:
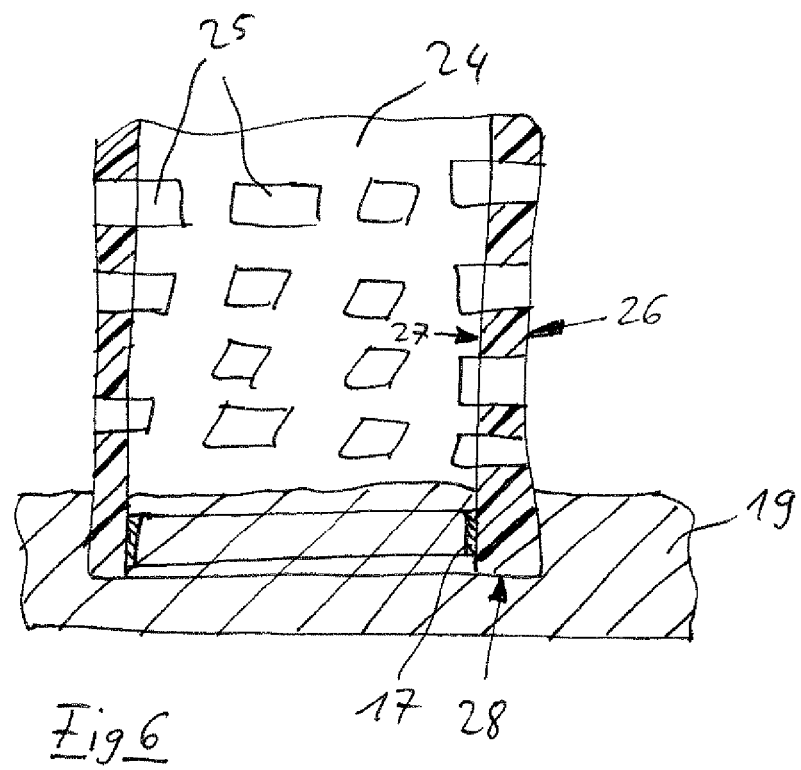
FIG. 6 a further alternative of the support tube in section.

In FIG. 6 a further alternative to the embodiments illustrated in FIGS. 4 and 5 is shown. Same parts are identified with same reference numerals. In this embodiment the non-woven ring 17 is applied to the inner surface 27 of the support tube 24.

What is claimed is:

1. A filter element comprising:
   at least one plastic part;
   a filter medium;
   a potting compound that forms a connection between the at least one plastic part and the filter medium;
   a connecting part connected fixedly to the at least one plastic part;
   wherein the connecting part is a nonwoven part that has a fleece section and a connecting section,
   wherein the potting compound penetrates at least partially into the non-woven connecting part,
   wherein the at least one plastic part is produced by injection molding and is connected to the connecting part by being injection molded to the connecting part,
   wherein said filter medium is a separate component from and is not said connecting part.

2. The filter element according to claim 1, wherein
   the at least one plastic part is a terminal disk and
   wherein the connecting part is arranged in a contact area where the terminal disk and the filter medium are in contact with one another,
   wherein said potting compound penetrates said fleece section of said connecting part, fixedly connecting said connecting part to said filter medium.

3. The filter element according to claim 1, wherein
   the at least one plastic part is a support tube with an outer circumference and two end faces,
   wherein the connecting part is arranged in the area of the end faces.

4. The filter element according to claim 3, wherein
   the connecting part is non-woven ring arranged on said end face of the support tube,
   wherein the at least one plastic part is a terminal disk of a filter element,
   wherein said connecting part non-detachably connects said support tube to said terminal end disk.

5. The filter element according to claim 3, wherein
   the connecting part is non-woven ring arranged on either an outer surface or an inner circumference of the support tube.

6. The filter element according to claim 1, wherein
   said at least one plastic part is a terminal end disk,
   wherein the connecting section of the connecting part is embedded into and fixedly connected to said at least one plastic part by injection molding,
   wherein the fleece section of the connecting part projects outwards away from the at least one plastic part to contact said filter medium,
   wherein said potting compound penetrates said fleece section and fixedly connects said connecting part to said filter medium.

* * * * *